United States Patent
Usuda et al.

(10) Patent No.: US 9,807,369 B2
(45) Date of Patent: Oct. 31, 2017

(54) 3D IMAGING APPARATUS

(71) Applicant: Panasonic Intellectual Property Management Co., Ltd., Osaka (JP)

(72) Inventors: Manabu Usuda, Hyogo (JP); Kazutoshi Onozawa, Osaka (JP); Kazuo Fujiwara, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 571 days.

(21) Appl. No.: 14/043,899

(22) Filed: Oct. 2, 2013

(65) Prior Publication Data

US 2014/0028804 A1   Jan. 30, 2014

Related U.S. Application Data

(63) Continuation of application No. PCT/JP2012/002001, filed on Mar. 23, 2012.

(30) Foreign Application Priority Data

Apr. 7, 2011   (JP) ................................ 2011-085820

(51) Int. Cl.
*H04N 13/02* (2006.01)
*G01S 17/02* (2006.01)
(Continued)

(52) U.S. Cl.
CPC ......... *H04N 13/0239* (2013.01); *G01C 11/06* (2013.01); *G01S 7/4914* (2013.01);
(Continued)

(58) Field of Classification Search
None
See application file for complete search history.

(56) References Cited

U.S. PATENT DOCUMENTS

| 7,499,638 B2 | 3/2009 | Arai et al. |
| 7,821,552 B2 | 10/2010 | Suzuki |

(Continued)

FOREIGN PATENT DOCUMENTS

| CN | 101706957 | 5/2010 |
| CN | 101799939 | 8/2010 |

(Continued)

OTHER PUBLICATIONS

International Search Report issued Jun. 26, 2012 in International (PCT) Application No. PCT/JP2012/002001.

(Continued)

*Primary Examiner* — Mohammed Rahaman
(74) *Attorney, Agent, or Firm* — Wenderoth, Lind & Ponack, L.L.P.

(57) ABSTRACT

A 3D imaging apparatus includes: a first image capturing camera generating a base image to be used for obtaining a first range image showing a three-dimensional character of an object; a second image capturing camera generating a reference image to be used for obtaining the first range image; a stereo matching unit searching for corresponding pixels between the base image and the reference image, and generating a first range image by calculating a disparity between the corresponding pixels; and a light source emitting to the object infrared light whose intensity is modulated. The first image capturing camera further generates a second range image by receiving a reflected light in synchronization with the modulated intensity. The reflected light is the infrared light reflected off the object. The second range image includes range information on a range between a point of reflection off the object and the first imaging unit.

7 Claims, 14 Drawing Sheets

(51) Int. Cl.
  *G01S 17/89* (2006.01)
  *G01S 7/491* (2006.01)
  *G01C 11/06* (2006.01)

(52) U.S. Cl.
  CPC ............ *G01S 17/023* (2013.01); *G01S 17/89* (2013.01); *H04N 13/0253* (2013.01); *H04N 13/0257* (2013.01); *H04N 13/0271* (2013.01)

(56) References Cited

U.S. PATENT DOCUMENTS

| | | | |
|---|---|---|---|
| 2006/0072914 A1 | 4/2006 | Arai et al. | |
| 2007/0146512 A1* | 6/2007 | Suzuki | H04N 5/332 348/272 |
| 2008/0106620 A1* | 5/2008 | Sawachi | H04N 13/0257 348/262 |
| 2010/0309292 A1* | 12/2010 | Ho | H04N 13/026 348/47 |

FOREIGN PATENT DOCUMENTS

| | | | | |
|---|---|---|---|---|
| JP | 06-230115 | | 8/1994 | |
| JP | 09-171075 | | 6/1997 | |
| JP | 2001-264033 | | 9/2001 | |
| JP | 2005-077130 | | 3/2005 | |
| JP | 2007-202108 | | 8/2007 | |
| JP | 2008-116309 | | 5/2008 | |
| JP | 2008116309 | * | 5/2008 | ............ G01C 11/06 |
| JP | 2009-047496 | | 3/2009 | |
| JP | 2009-047497 | | 3/2009 | |
| JP | 2009-047497 | * | 5/2009 | |
| JP | 2009-145386 | | 7/2009 | |
| JP | 2009-253447 | | 10/2009 | |

OTHER PUBLICATIONS

Chinese Office Action issued Feb. 28, 2015 in corresponding Chinese Patent Application No. 201280015564.1 (with English translation).

* cited by examiner

| R | B | R | B | R |
|---|---|---|---|---|
| G | IR1 | G | IR2 | G |
| B | R | B | R | B |
| IR1 | G | IR2 | G | IR1 |

3D IMAGING APPARATUS

CROSS REFERENCE TO RELATED APPLICATIONS

This is a continuation application of PCT International Application No. PCT/JP2012/002001 filed on Mar. 23, 2012, designating the United States of America, which is based on and claims priority of Japanese Patent Application No. 2011-085820 filed on Apr. 7, 2011. The entire disclosures of the above-identified applications, including the specifications, drawings and claims are incorporated herein by reference in their entirety.

FIELD

The present disclosure relates to a 3D imaging apparatus which obtains a range image showing the three-dimensional characteristics of an object.

BACKGROUND 3D imaging apparatuses are used for obtaining not only image information of an object but also a range image—that is an image which shows the 3D characteristics and range information of an object. Exemplary applications of such 3D imaging apparatuses include automotive obstacle-detection systems, robotically assisted surgical systems, and gesture recognition systems for arcade games.

One of typical and disclosed imaging techniques for the 3D imaging apparatus is to obtain a range image by emitting intensity-modulated light to an object (typically infrared light) and measuring for each pixels a time period for the emitted light to come back from the object (time of flight or TOF). This technique is referred to as the TOF depth measurement.

Specifically, the TOF depth measurement is applied to 3D imaging cameras (also referred to as TOF camera). A TOF camera emits to an object light modulated so that the light intensity decreases as the time elapses, and obtains the light bounced on the object with predetermined shutter timing or a time period while the shutter is opening. In such a camera, the emitted light is modulated so that the intensity of the light decreases over time. Thus, as the range between the camera and the object is shorter, the time-of-flight of the light (the time that elapses when the light emitted from the camera bounces on the object and travels back to the camera) is shorter. Accordingly, the amount of the emitted light does not decrease much, and the intensity of the emitted light is high. In contrast, as the range between the camera and the object is longer, the time-of-flight of the light is longer. Accordingly, the amount of the emitted light decreases much, and the intensity of the emitted light is low. Hence, the intensity of the light received by each of the pixels is higher as the range to the object is shorter, and, based on the intensity of the received light for each pixel, information on the range to the object is provided as the brightness of the object.

Patent Literature 1 discloses an imaging technique other than the TOF depth measurement. The technique is to obtain a 3D image of an object with no light emitted to the object. Specifically, the technique utilizes two cameras placed in parallel at a predetermined interval to obtain an object, and searches for corresponding pixels (stereo matching) between the obtained two images (a base image obtained by a base camera and a reference image obtained by a reference camera). Then, a difference of corresponding parts on the object images is measured by the principle of triangulation, and a range image of the object is obtained. This is how the stereo matching works. Moreover, in addition to the two cameras for the stereo matching. Patent Literature 1 proposes a 3D imaging apparatus including an additional TOF camera separately located from the two cameras.

CITATION LIST

Patent Literature

[PTL 1] Japanese Unexamined Patent Application Publication No. 2009-47497

SUMMARY

Technical Problem

The conventional 3D imaging apparatus disclosed in Patent Literature 1 first detects an object by obtaining an image using one of the two stereo cameras and extracting a silhouette of the object from the image. The 3D imaging apparatus then searches for corresponding pixels only within the area of the object's silhouette by the stereo matching. When the corresponding pixels are found, the 3D imaging apparatus generates a range image by the stereo matching. In contrast, when no corresponding pixels are found within the area of the object's silhouette, corresponding image data obtained by the TOF depth measurement is applied in order to complement for the data of the range image obtained by the stereo matching.

In the 3D imaging apparatus disclosed in Patent Literature 1, however, the additional TOF camera is separately provided from neither of the two camera forming a stereo camera. Hence, the viewpoints from the TOF cameras to the object are slightly misaligned. In the case where the corresponding pixels cannot be found by the stereo matching, the lines of sight to the image are inevitably misaligned when part of pixel data of the stereo camera is complemented by pixel data obtained by the TOF depth measurement. Consequently, the shift causes a problem that the 3D imaging apparatus cannot appropriately correct data of a range image.

Moreover, the 3D imaging apparatus disclosed in the Patent Literature 1 is a tri-lens imaging apparatus including two cameras for the stereo matching and another camera. Such a structure poses a problem in downsizing the imaging apparatus.

The present disclosure is conceived in view of the above problems and aims to provide a 3D imaging apparatus which can be downsized and causes no misalignment of the line of sight to an image in correcting range image data performed when corresponding pixels cannot be found by the stereo matching.

Solution to Problems

In order to solve the above problems, a 3D imaging apparatus according to an aspect of the present disclosure includes: a first imaging unit which captures an object to generate a base image to be used, for obtaining a first range image which shows a three-dimensional character of the object in an image; a second imaging unit which is located separately from the first imaging unit and captures the object to generate a reference image to be used for obtaining the first range image; a corresponding pixel searching unit which searches for corresponding pixels between the base image and the reference image; a first range image generating unit which generates the first range image by calculating a disparity based on the corresponding pixels; a light source for emitting to the object infrared light whose intensity is modulated; and a synchronization signal supplying unit which supplies the first imaging unit with a synchronization signal synchronized with the modulated intensity, wherein the first imaging unit further generates a second range image by receiving a reflected light based on the synchronization signal, the reflected light being the infrared light reflected off the object, and the second range image including range information on a range between a point of reflection off the object and the first imaging unit.

The above structure shows that the first imaging unit, which operates as a base imaging unit for obtaining the first range image generated by so-called stereo matching, also generates the second range image by so-called the TOF depth measurement. Here, the stereo matching involves searching for corresponding pixels between a base image and a reference image to calculate disparity between the images, and the TOF depth measurement involves receiving modulated infrared light which is reflected off an object and synchronized with the modulation. Hence, the lines of sight completely match with each other between the first and the second range images. In the case where no corresponding pixels are present in generating the first range image by the stereo matching, no misalignment is found between the lines of sight even though such pixels are to be substituted for the corresponding pixel data of the second range image.

In the above features, the first imaging unit operating as the base imaging unit for generating the first range image also generates the second range image. Hence, the 3D imaging apparatus is implemented as a twin-lens camera, which contributes to simplifying the apparatus.

The 3D imaging apparatus may further include a range measurement accuracy determining unit which determines accuracy of range information on the object and included in the first range image and the range information included in the second range image, by comparing data of the first range image with data of the second range image between the corresponding pixels, wherein, based on a result of the determination of the accuracy, the range measurement accuracy determining unit may generate a third range image whose pixel data is reconstructed from the first range image and the second range image.

Hence, the range measurement accuracy determining unit compares the first range image data with the second range image data to determine range measurement accuracy, and reconstructs data with low range measurement accuracy into data with high range measurement accuracy.

In the case where the corresponding pixels are not found by the corresponding pixel searching unit when the first range image are being generated, the distance measurement accuracy determining unit may generate the third range image by substituting pixel data of the second range image for the corresponding pixels.

Thanks to the feature, no misalignment is found between the lines of sight even though the pixel data of the first range image is substituted for corresponding pixel data of the second range image obtained. Hence, the range image data is appropriately corrected to be made more accurate.

Each of the first imaging unit and the second imaging unit may include: a solid-state imaging device including an imaging area having unit arrays two-dimensionally arranged, each of the unit arrays including a first unit pixel provided with a filter which passes red visible light and infrared light, a second unit pixel provided with a filter which passes green visible light and infrared light, a third unit pixel provided with a filter which passes blue visible light and infrared light, and a fourth unit pixel provided with a filter which passes infrared light; and a signal extracting unit which extracts from the solid-state imaging device a color image signal generated of visible light and an image signal generated of infrared light. The first imaging unit may generate one of the base image and the second range image from the image signal. The second imaging unit may generate the reference image from the image signal.

The above feature makes it possible to obtain (i) image signals generated of visible light by an infrared differential operation when obtaining an image in bright light, as well as (ii) image signals (monochrome image signals) generated of infrared light when obtaining an image in the dark such as nighttime. Hence, the 3D imaging apparatus can obtain an image both in bright light and in the dark.

In addition, the arrangement of the color filters as described above makes it possible to obtain image signals, generated of infrared light, from all the pixels on a light-receiving element. This feature allows the second range image and an image generated of infrared light to have higher resolution.

Each of the first imaging unit and the second imaging unit may include: a solid-state imaging device including an imaging area having unit arrays two-dimensionally arranged, each of the unit arrays including a first unit pixel provided with a filter which passes visible light having a specific wavelength range and infrared light, a second unit pixel provided with the filter, a third unit pixel provided with the filter, and a fourth unit pixel provided with a filter which passes infrared light; and a signal extracting unit which extracts from the solid-state imaging device an image signal generated of visible light and an image signal generated of infrared light. The first imaging unit may generate one of the base image and the second range image from the image signal. The second imaging unit may generate the reference image from the image signal.

In the case when no color image generated of visible light is required, each of the unit pixels may be provided with a color filter sensitive to a specific wavelength range of visible light and a wavelength range of infrared light.

The signal extracting unit may include an infrared subtracting unit which subtracts a signal of the fourth unit pixel from each of a signal of the first unit pixel, a signal of the second unit pixel, and a signal of the third unit pixel. The signal extracting unit may extract one of the image signal generated of the visible light and the image signal generated of the infrared light from an image signal generated of visible light by the infrared subtraction unit and a luminance signal generated by one of the first unit pixel to fourth unit pixel.

Thanks to the above feature, an infrared signal is subtracted from each of a (red+infrared) signal, a (green+infrared) signal, and a (blue+infrared) signal, and a color signal is generated. Hence, a luminance signal is synthesized with the color signal, and a color image signal is easily obtained. Moreover, when the infrared light is emitted to the pixels, sufficient amount of luminance signals are obtained since all the pixels are sensitive to the infrared light. Consequently, a synthesized infrared light image signal successfully has excellent contrast.

Advantageous Effects

According to the present disclosure, the first imaging unit, which generates the first range image by searching for corresponding pixels between a base image and a reference image to obtain disparity—that is stereo matching—, also generates the second range image by receiving modulated infrared light which is reflected off an object and synchronized with the modulation—that is the TOF depth measurement. Hence, in the case where no corresponding pixels are present in generating the first range image by the stereo matching, no misalignment is found between the lines of sight even though such pixels are to be substituted for the corresponding pixel data of the second range image. Such a feature makes it possible to correct range image data with a twin-lens camera, so that the range image data achieves higher accuracy.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT

Embodiment

Described hereinafter is a 3D imaging apparatus according to an embodiment, with reference to the drawings. It is noted that the present disclosure is detailed by the following embodiment and the drawings attached thereto. The embodiment and the drawings are examples in all respects, and the present disclosure shall not be defined only by the embodiment and the drawings.

Figure 1:
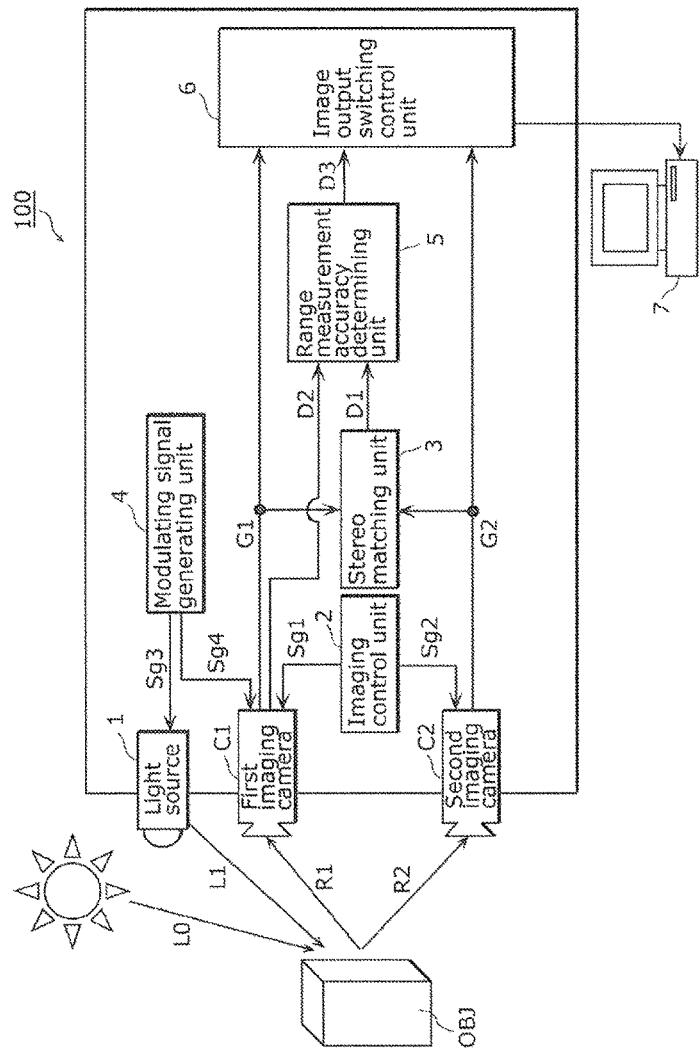
FIG. 1 depicts a block diagram showing a main structure of a 3D imaging apparatus according to an embodiment.

FIG. 1 depicts a block diagram showing a main structure of a 3D imaging apparatus 100 according to the embodiment. The 3D imaging apparatus 100 in FIG. 1 includes a first imaging camera C1, a second imaging camera C2, a light source 1, an imaging control unit 2, a stereo matching unit 3, a modulating signal generating unit 4, a range measurement accuracy determining unit 5, and an image output switching control unit 6.

In the front, the 3D imaging apparatus 100 has the light source 1 for emitting infrared light L1 to an object OBJ, the first imaging camera C1 for receiving reflected light R1 from the object OBJ and imaging the object OBJ, and the second imaging camera C2 for receiving reflected light R2 from the object OBJ and imaging the object OBJ. Here, the reflected lights R1 and R2 may include, for example, environment light L0, such as sunlight, reflected off the object OBJ as well as the infrared light L1 reflected off the object OBJ.

Each of the first imaging camera C1 and the second imaging camera C2 is an imaging unit to obtain a base image and a reference image to be used for generating a first range image showing a 3D image of the object OBJ by stereo matching. The first imaging camera C1 and the second imaging camera C2 are placed in parallel at a predetermined interval.

The first imaging camera C1 and the second imaging camera C2 obtain images with synchronous shutter timing indicated by synchronization signals Sg1 and Sg2 transmitted from the imaging control unit 2.

The reflected light R1 which enters the first imaging camera C1 is converted into an image signal G1 via the first imaging camera C1, and the converted image signal G1 is transmitted to the stereo matching unit 3 as well as to the image output switching control unit 6. In contrast, the reflected light R2 which enters the second imaging camera C2 is converted into an image signal G2 via the second imaging camera C2, and the converted image signal G2 is transmitted to the stereo matching unit 3 as well as to the image output switching control unit 6. Here, the image signal G1 and the image signal G2 are respectively to a base image and a reference image for the stereo matching.

The stereo matching unit 3 is a corresponding pixel searching unit which searches for corresponding pixels between the image signal G1 and the image signal G2. The stereo matching unit 3 also works as a first range image generating unit which generates a first range image signal D1 by calculating a difference of a part of an object image based on the corresponding pixels, using the principle of triangulation. The generated first range image signal D1 is sent to the range measurement accuracy determining unit 5.

The modulating signal generating unit 4 also works as a synchronization signal supplying unit which (i) sends the light source 1 a modulating signal Sg3, and (ii) supplies the first imaging camera C1 with a synchronization signal Sg4 synchronized with the modulating signal Sg3.

Moreover, the first imaging camera C1 receives, based on the information from the synchronization signal Sg1, the reflected light R1 with predetermined shutter timing or a predetermined shutter speed. Here, the reflected light R1 includes the infrared light L1 that reflects off the object OBJ, and the light intensity of the infrared light L1 is modulated by the modulating signal Sg3. The first imaging camera C1 is a TOF camera which is capable of measuring, for each of the pixels, a time of emitted light coming back from the object, and generating a second range image signal D2 including range information on the range between a point of reflection on the object OBJ and the first imaging camera C1, in other words, the first imaging camera C1 according to the embodiment also works as a second range image generating unit. The generated second range image signal D2 is sent to the range measurement accuracy determining unit 5.

The range measurement accuracy determining unit 5 determines the accuracy of a measured depth by comparing data of the first range image signal D1 with data of the second range image signal D2 between the corresponding pixels. Based on the determination result, the range measurement accuracy determining unit 5 generates a third range image signal D3 whose data is reconstructed as necessary from the first range image signal D1 and the second range image signal D2. In the case where the corresponding pixels are not found by the stereo matching unit 3 when the first range image signal D1 are being generated, the range measurement accuracy determining unit 5 generates the third range image signal D3 by substituting appropriate pixel data for the pixel data of the second range image signal D2. The generated third range image signal D3 is sent to the image output switching control unit 6.

The image output switching control unit 6 performs switching control for selectively or simultaneously outputting the image signal G1, the image signal G2, and the third range image signal D3 on a display 7.

Thanks to the above features, the first imaging camera C1 that works as a base imaging unit for generating the first range image also generate the second range image by the TOF depth measurement. Hence, the lines of sight completely match with each other between the first and the second range images. Hence, in the case where no corresponding pixels are present in generating the first range image by the stereo matching, no misalignment is found between the lines of sight even though such pixels are to be substituted for the corresponding pixel data of the second range image obtained by the TOF depth measurement. Hence, the range image data is appropriately corrected to be made more accurate.

In the above features, the first imaging unit—that is a stereo camera for obtaining a base image—also generates a range image by the TOF depth measurement. Hence, the 3D imaging apparatus 100 is implemented as a twin-lens camera, which contributes to simplifying the apparatus.

Moreover, the range measurement accuracy determining unit 5 compares the first range image data with the second range image data to determine range measurement accuracy, and, for each of data items, mutually complements a data item which is low in range measurement accuracy with a data item which is high in range measurement accuracy.

Specifically, no misalignment is found between the lines of sight even though the pixel data of the first range image obtained by the stereo matching is substituted for corresponding pixel data of the second range image obtained by the TOF depth measurement. Hence, the range image data is appropriately corrected to be made more accurate.

That is the main structure of the 3D imaging apparatus 100 according to the embodiment.

Described next is the main structures of the first imaging camera C1 and the second imaging camera C2 according to the embodiment, with reference to FIGS. 2 and 3.

Figure 2:
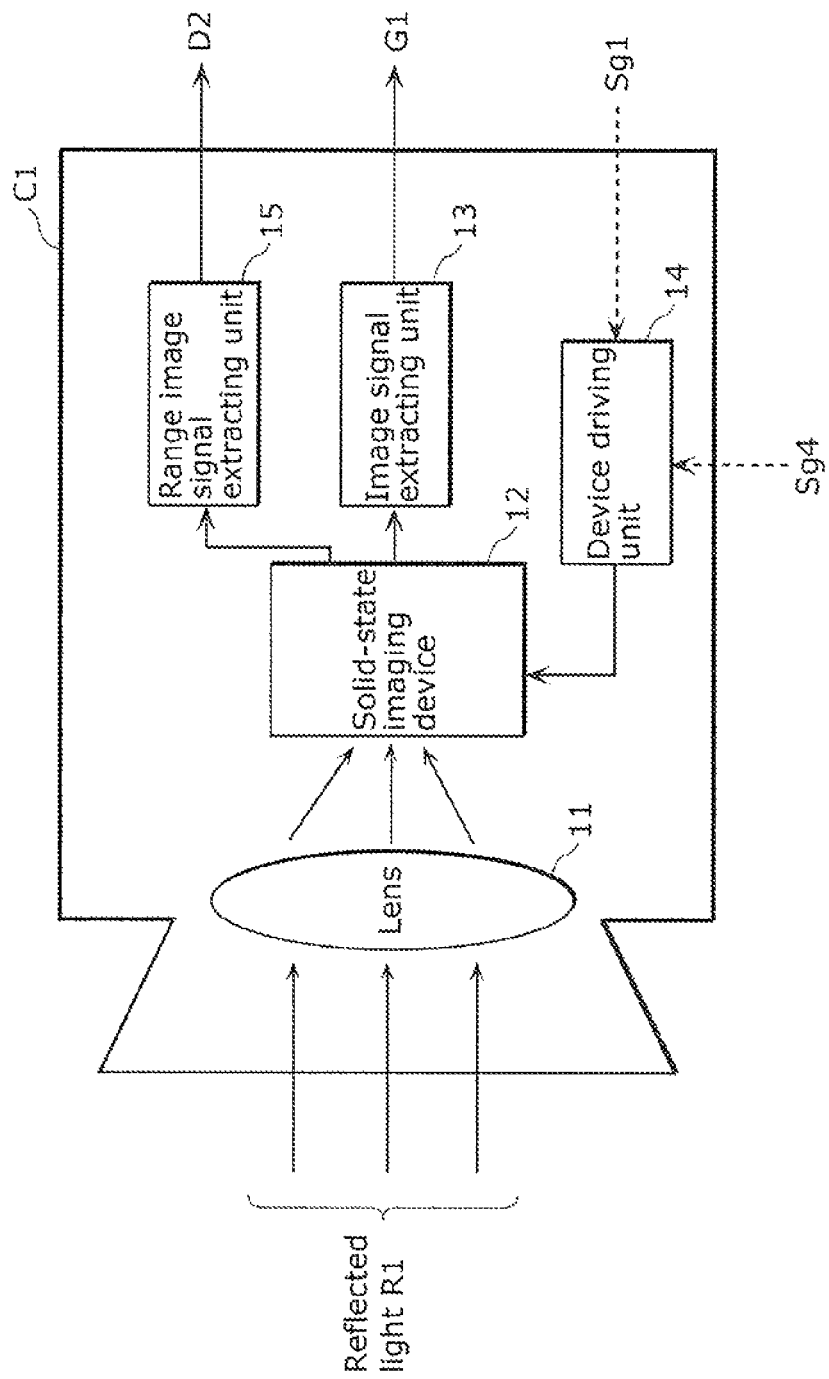
FIG. 2 depicts a block diagram showing a main structure of a first imaging camera according to the embodiment.

FIG. 2 depicts a block diagram showing the main structure of the first imaging camera C1 according to the embodiment. The first imaging camera C1 in FIG. 2 includes a lens 11, a solid-state imaging device 12, an image signal extracting unit 13, a device driving unit 14, and a range image signal extracting unit 15.

The lens 11 is a light-collecting device to collect the reflected light R1 which enters the first imaging camera C1 to form an image on an imaging area of the solid-state imaging device 12.

The solid-state imaging device 12 is a semiconductor device which photoelectrically-converts the light collected by the lens 11 into an electric charge signal.

The image signal extracting unit 13 generates an image signal from the electric charge signal generated by the solid-state imaging device 12.

The device driving unit 14 obtains an electric charge signal from each of pixels in the solid-state imaging device 12. The device driving unit 14 includes a receiving unit for receiving the synchronization signal Sg4 to be transmitted from the modulating signal generating unit 4 provided outside the imaging camera. Based on the information from the synchronization signal Sg4, the device driving unit 14 is capable of obtaining an electric charge signal from each of the pixels in the solid-state imaging device 12 with predetermined shutter timing and a predetermined shutter speed.

The range image signal extracting unit 15 generates the second range image signal D2 from the electric charge signal generated by the solid-state imaging device 12.

Figure 3:
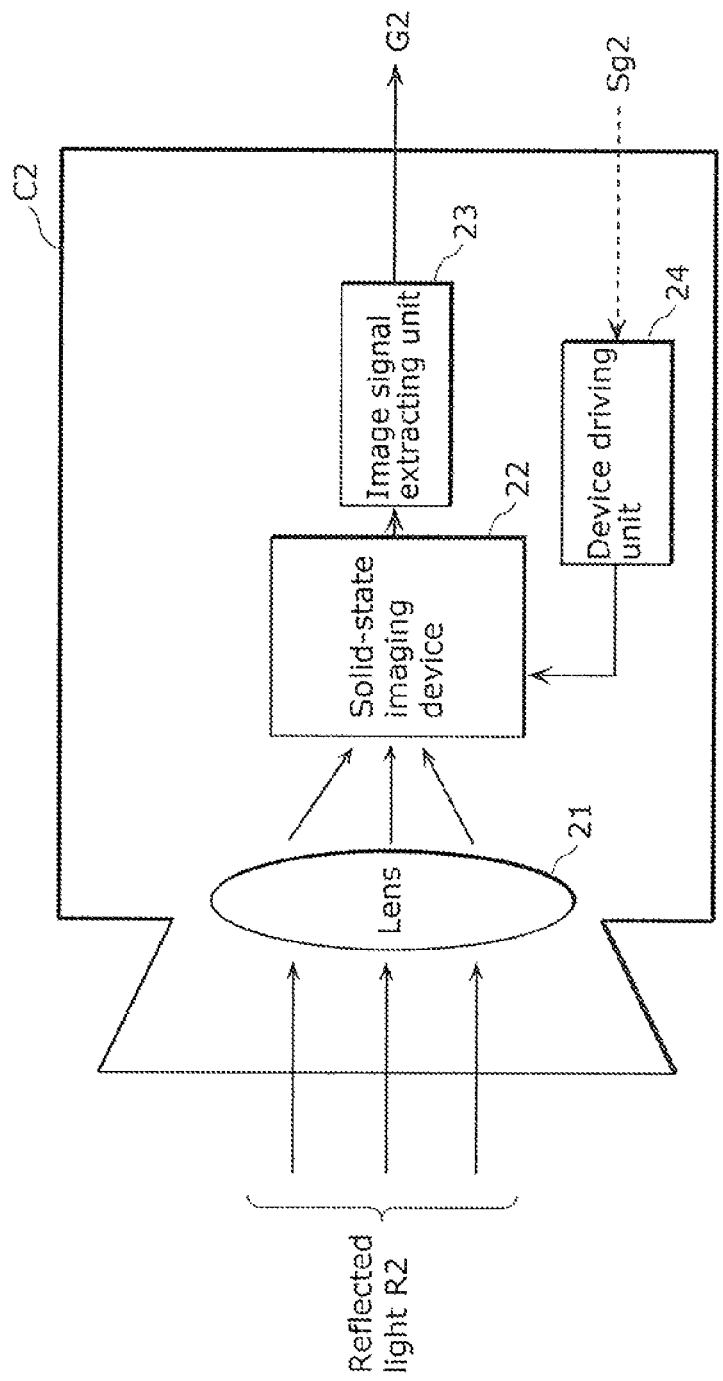
FIG. 3 depicts a block diagram showing a main structure of a second imaging camera according to the embodiment.

FIG. 3 depicts a block diagram showing the main structure of the second imaging camera C2 according to the embodiment. The second imaging camera C2 in FIG. 3 includes a lens 21, a solid-state imaging device 22, an image signal extracting unit 23, and a device driving unit 24.

The lens 21 is a light-collecting device to collect the reflected light R2 that enters the second imaging camera C2 to form an image on an imaging area of the solid-state imaging device 22.

The solid-state imaging device 22 is a semiconductor device which photoelectrically-converts the light collected by the lens 21 into an electric charge signal.

The image signal extracting unit 23 generates an image signal from the electric charge signal generated by the solid-state imaging device 22.

The device driving unit 24 obtains an electric charge signal from each of pixels in the solid-state imaging device 22.

Figure 4:
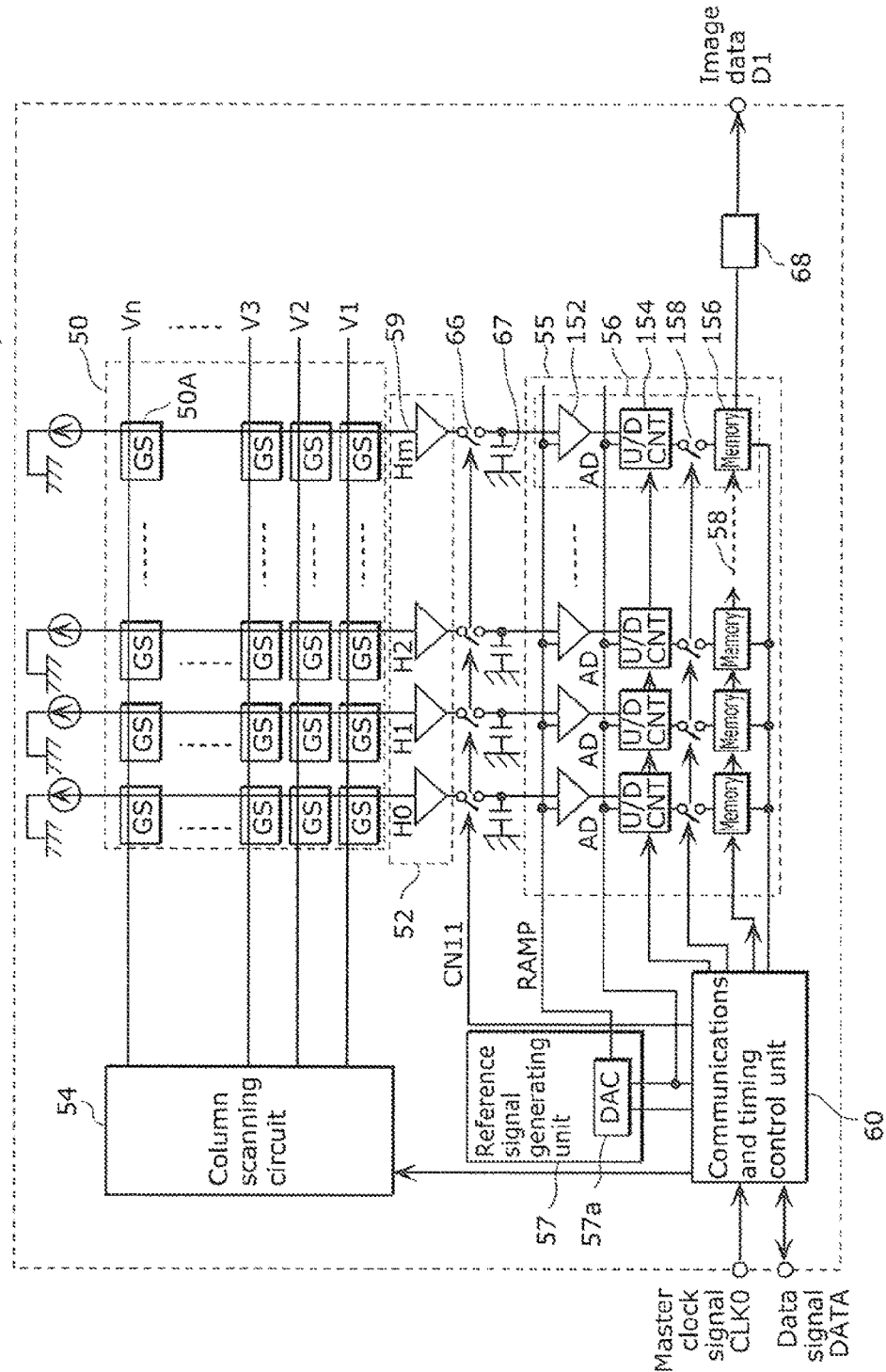
FIG. 4 depicts a functional block diagram showing a solid-state imaging device according to the embodiment.

FIG. 4 depicts a functional block diagram showing one of the solid-state imaging devices 12 and 22 according to the embodiment. One of the solid-state imaging devices 12 and 22 in FIG. 4 is a complementary metal oxide semiconductor (CMOS) solid-state imaging device, and includes a pixel unit (pixel array) 50, a column scanning circuit (low scanning circuit) 54, a communications and timing control unit 60, an analogue-digital (AD) converting circuit 55, a reference signal generating unit 57, an output I/F 68, a signal holding switch 66, a signal holding capacitor 67, and a column amplifier 52. Described hereinafter is how the solid-state imaging devices 12 and 22 work, with reference to FIG. 4.

The pixel unit 50 has multiple unit cells 50A arranged two-dimensionally (in a matrix) on a well of a semiconductor substrate. Each of the unit cells 50A includes multiple unit pixels (photoelectric conversion devices). Each unit cell 50A is connected to a signal line controlled by the column scanning circuit 54 and to a column signal line 59 which sends a voltage signal from the unit cell 50A to the AD converting circuit 55.

The column scanning circuit 54 scans the unit cells 50A in a column direction for each row, and selects a row of the unit cells 50A that provide the voltage signals to the column signal lines 59.

The communications and timing control unit 60 receives a master clock signal CLK0 and a data signal DATA via an external terminal, and generates various internal clocks to control the reference signal generating unit 57 and the column scanning circuit 54.

The reference signal generating unit 57 includes a digital-analogue converter (DAC) 57e which supplies a reference voltage RAMP for AD conversion to column analogue-digital convertor (AD) circuits 56 in the AD converting circuit 55.

The column amplifier 52 is provided for all the columns of the unit cells 50A. One of signal holding switches 66 and one of signal holding capacitors 67 are provided to a corresponding one of the columns of the unit cells 50A. The column amplifier 52 amplifies voltage signals provided from the unit cells 50A. The signal holding capacitors 67 hold the amplified voltage signals provided via the signal holding switches 66. The column amplifier 52 can amplify the voltage signals from the unit cells 50A, which contributes to improving S/N and switching gains.

The AD converting circuit 55 includes the column AD circuits 56 each provided to a corresponding one of the columns of the unit cells 50A. Using the reference voltage RAMP generated by the DAC 57a, the column AD circuits 56 convert analogue voltage signals, provided from the unit cells 50A and held in the signal holding capacitors 67, into digital signals.

Each of the column AD circuits 56 includes a voltage comparing unit 152, a switch 158, and a data storage unit 156. The voltage comparing unit 152 compares the analogue voltage signals with the reference voltage RAMP, the analogue voltage signals being provided from the unit cells 50A via one of the column signal lines 59 (H0, H1, ... ) and one of the signal holding capacitors 67 each corresponding to the voltage comparing unit 152. The data storage unit 156 is a memory for holding a time period, lasting until the voltage comparing unit 152 finishes the comparison, as a result counted by the counting unit 154.

Each one of two input terminals, which are provided to each of the voltage comparing units 152, receives in common the reference voltage RAMP generated by the DAC 57a and appearing stepwise. Each of the other one of the two input terminals receives a voltage signal from the pixel unit 50. The other input terminals are each connected to one of the signal holding capacitors 67 that is provided to a column corresponding to the other input terminal. An output signal from the voltage comparing unit 152 is supplied to each counting unit 154.

The column AD circuit 56 starts counting with a clock signal as soon as the reference voltage RAMP is supplied to the voltage comparing unit 152, and performs AD conversion by continuing the counting until the comparison between the reference voltage RAMP and the analogue voltage signal provided via the signal holding capacitor 67 allows a pulse signal to be obtained.

Here, while performing the AD conversion, the column AD circuits 56 obtains from a pixel signal (voltage signal), provided via the signal holding capacitor 67 and placed in a voltage mode, a difference between a signal level (noise level) immediately after a pixel reset and a true (the amount of received-light basis) signal level Vsig. Such an operation makes it possible to remove from the voltage signal noise signal components including fixed pattern noise (FPN) and reset noise.

It is noted that the column AD circuits 56 downcounts a noise level and, upcounts a signal level to obtain the true signal level Vsig alone. A signal which is digitalized by the column AD circuits 56 is provided to the output I/F 68 via a row signal line 58.

It is noted that the solid-state imaging devices 12 and 22 in FIG. 4 include the column AD circuits 56. The AD circuits may be provided outside the solid-state imaging device.

Figure 5:
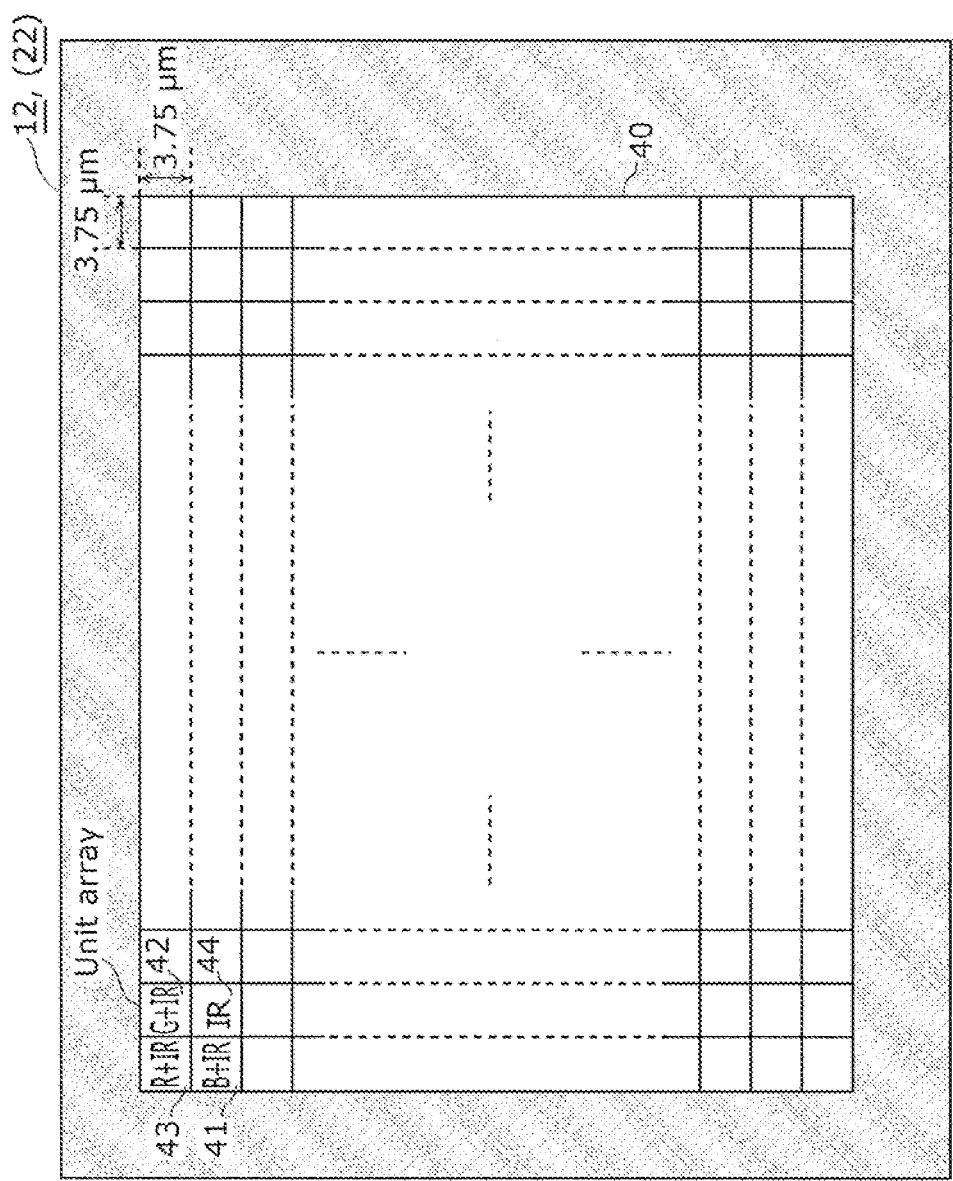
FIG. 5 depicts a schematic structure of the solid-state imaging device included in the first imaging camera according to the embodiment and arrangement of the pixels in the solid-state imaging device.

FIG. 5 depicts a schematic structure of the solid-state imaging device 12 included in the first imaging camera C1 according to the embodiment and arrangement of the pixels in the solid-state imaging device. The solid-state imaging device 12 has an imaging area 40 in which unit pixels (an exemplary size a unit pixel is 3.75 μm×3.75 μm) are two-dimensionally arranged. The unit pixels arranged in the imaging area 40 includes (i) unit pixels 41 each of which is sensitive to wavelength ranges of blue light and infrared light and provided with a filter that passes the lights, (ii) unit pixels 42 each of which is sensitive to wavelength ranges of green light and infrared light and provided with a filter that passes the lights, (iii) unit pixels 43 each of which is sensitive to wavelength ranges of red light and infrared light and provided with a filter that passes the lights, and (iv) unit pixels 44 each of which is sensitive only to a wavelength range of infrared light and provided with a filter that passes the light. Moreover, the imaging area 40 is provided with squares each having four unit pixels including a unit pixel 41, a unit pixel 42, a unit pixel 43, and a unit pixel 44.

Such an arrangement of the unit pixels 41, 42, 43, and 44 makes it possible to obtain both of a color visible light image and an infrared image. Described hereinafter is why the above pixel arrangement enables the obtainment of both the color visible light image and the infrared image, with reference to FIGS. 6A to 8D.

Figure 6A:
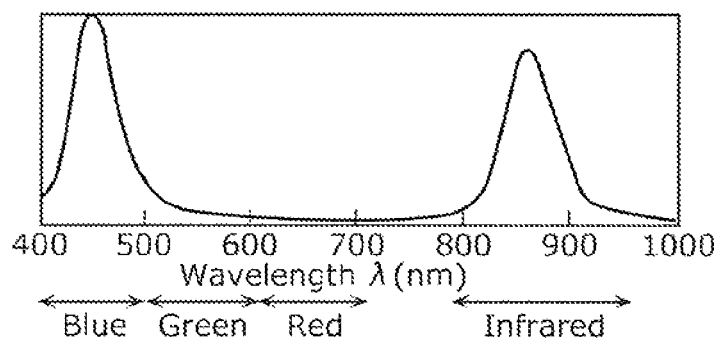
FIG. 6A depicts a graph showing a spectral-sensitivity characteristic of a unit pixel which is sensitive to wavelength ranges of blue light and infrared light.
Figure 6B:
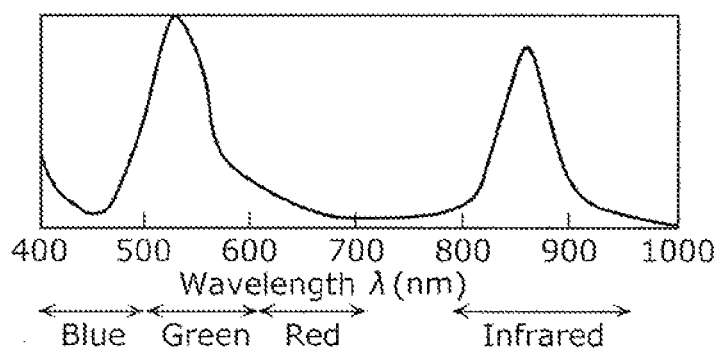
FIG. 6B depicts a graph showing a spectral-sensitivity characteristic of a unit pixel which is sensitive to wavelength ranges of green light and infrared light.
Figure 6C:
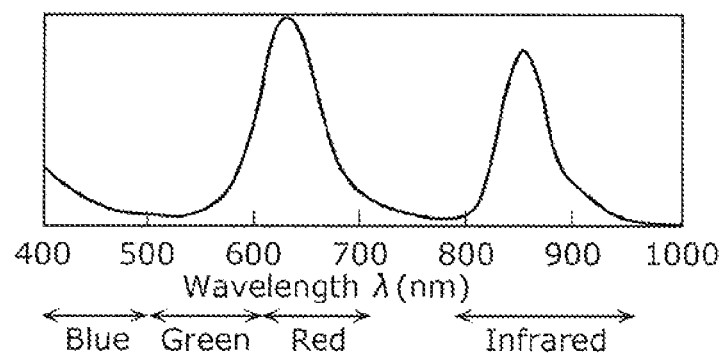
FIG. 6C depicts a graph showing a spectral-sensitivity characteristic of a unit pixel which is sensitive to wavelength ranges of red light and infrared light.
Figure 6D:
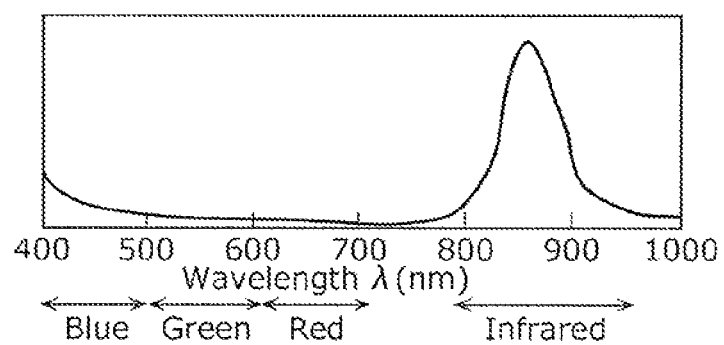
FIG. 6D depicts a graph showing a spectral-sensitivity characteristic of a unit pixel which is sensitive only to a wavelength range of infrared light.

FIGS. 6A to 6D depict graphs showing a spectral-sensitivity characteristic of each of the unit pixels according to the embodiment. The graph in FIG. 6A shows a spectral-sensitivity characteristic of the unit pixel 41 that is sensitive to wavelength ranges of blue light and infrared light. The graph in FIG. 6B shows a spectral-sensitivity characteristic of the unit pixel 42 that is sensitive to wavelength ranges of green light and infrared light. The graph in FIG. 6C shows a spectral-sensitivity characteristic of the unit pixel 43 that is sensitive to wavelength ranges of red light and infrared light. The graph in FIG. 6D shows a spectral-sensitivity characteristic of the unit pixel 41 that is sensitive only to a wavelength range of infrared light.

The image signal extracting unit 13 includes an infrared subtracting unit for subtracting an IR signal which is an electric charge signal of the unit pixel 44 from each of a (B+IR) signal which is an electric charge signal of the unit pixel 41, a (G+IR) signal which is an electric charge signal of the unit pixel 42, and an (R+IR) signal which is an electric charge signal of the unit pixel 43. Based on the results of the subtractions performed by the infrared subtracting unit, the image signal extracting unit 3 then generates an RGB color signal.

Figure 7A:
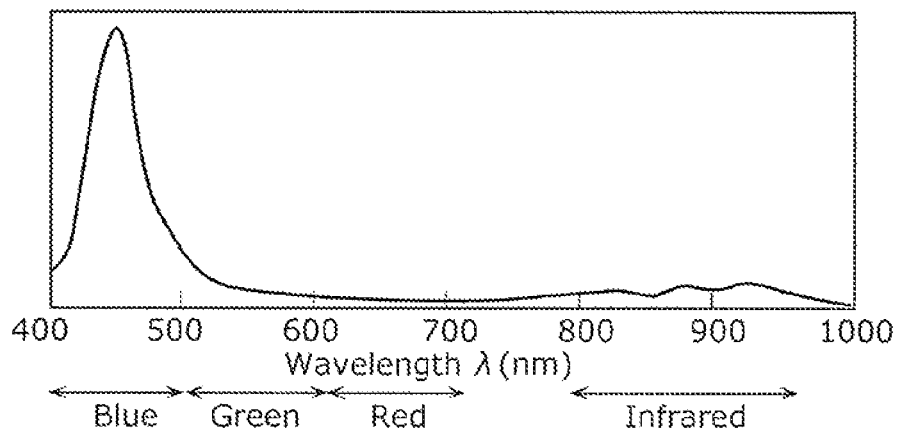
FIG. 7A depicts a graph showing a spectral-sensitivity characteristic obtained by subtracting the spectral-sensitivity characteristic in FIG. 6D from the spectral-sensitivity characteristic in FIG. 6A.
Figure 7B:
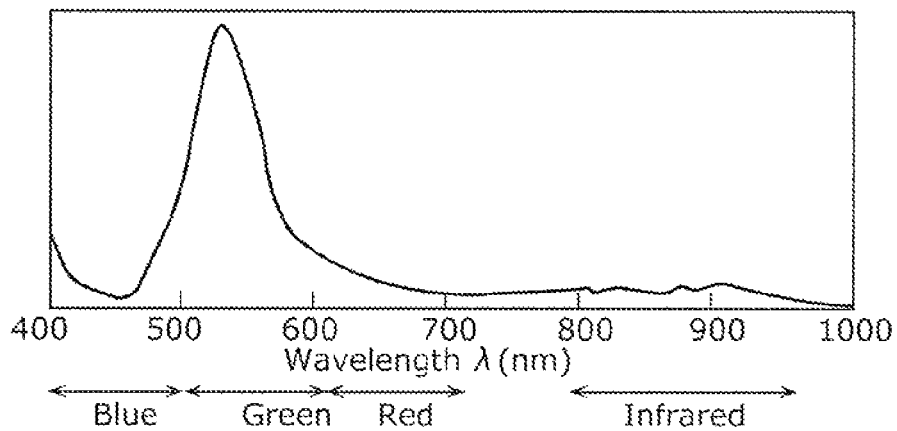
FIG. 7B depicts a graph showing a spectral-sensitivity characteristic obtained by subtracting the spectral-sensitivity characteristic in FIG. 6D from the spectral-sensitivity characteristic in FIG. 6B.
Figure 7C:
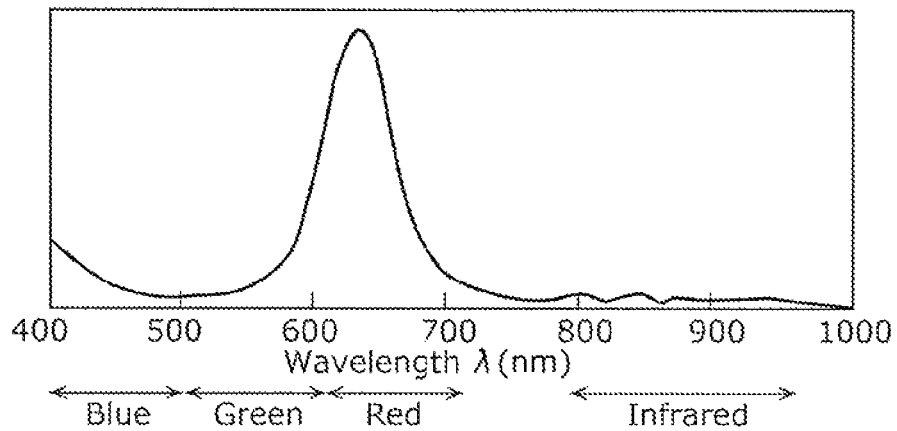
FIG. 7C depicts a graph showing a spectral-sensitivity characteristic obtained by subtracting the spectral-sensitivity characteristic in FIG. 6D from the spectral-sensitivity characteristic in FIG. 6C.
Figure 8A:
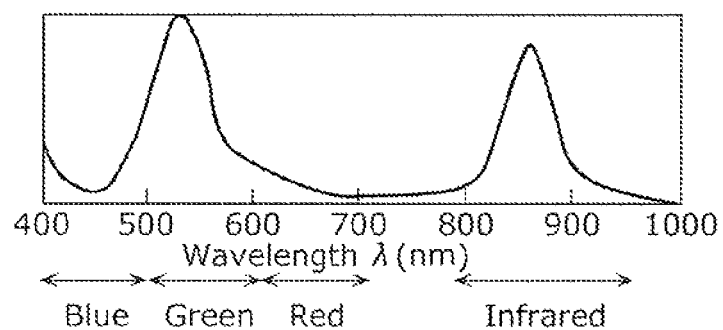
FIG. 8A depicts a graph showing a spectral-sensitivity characteristic of a unit pixel which is sensitive to a specific wavelength range of visible light and a wavelength range of infrared light.
Figure 8B:
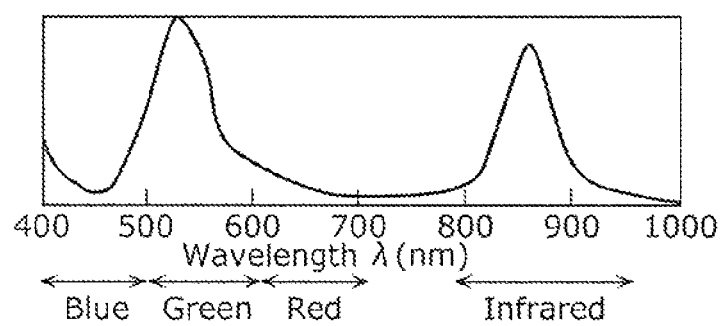
FIG. 8B depicts a graph showing spectra-sensitivity characteristic of a unit pixel which is sensitive to a specific wavelength range of visible light and a wavelength range of infrared light.
Figure 8C:
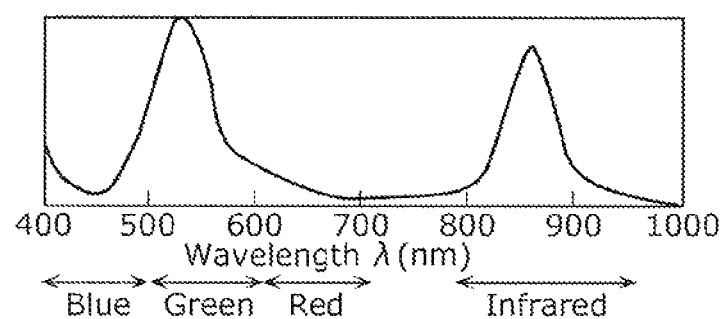
FIG. 8C depicts a graph showing a spectral-sensitivity characteristic of a unit pixel which is sensitive to a specific wavelength range of visible light and a wavelength range of infrared light.
Figure 8D:
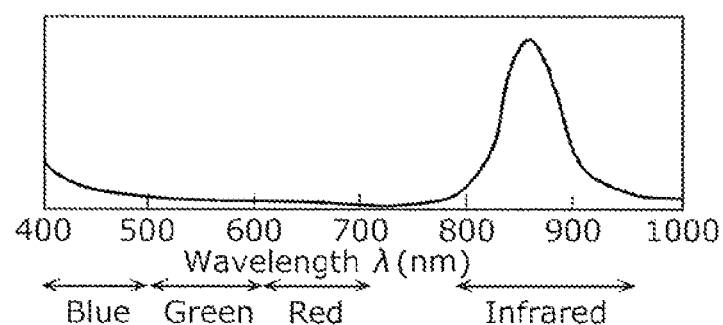
FIG. 8D depicts a graph showing a spectral-sensitivity characteristic of a unit pixel which is sensitive only to a wavelength range of infrared light.

FIGS. 7A to 7C show graphs in which the spectral-sensitivity characteristic of FIG. 60 is subtracted from each of the spectral-sensitivity characteristics in FIGS. 6A to 6C. The graphs show that the IR signal is subtracted from each of the (B+IR) signal, the (G+IR) signal, and the (R+IR) signal, and a color signal is generated. Based on the color signal and a luminance signal generated by one of the unit pixels 41, 42, 43, and 44, a color image signal generated of visible light is easily obtained.

In contrast, when infrared light is used for the solid-state imaging device 12 according to the embodiment for imaging in dark such as night, sufficient amount of luminance signals can be obtained without the subtraction of the IR signals since all of the unit pixels 41, 42, 43, and 44 are sensitive to infrared light. The solid-state imaging device 12 directly extracts the IR signals, and thus is capable of obtaining synthesized monochrome image signals having excellent contrast made with infrared light.

The solid-state imaging device 12 according to the embodiment can obtain (i) image signals generated of visible light by an infrared differential operation when obtaining an image in bright light, as well as (ii) image signals (monochrome image signals) generated of infrared light when obtaining an image in the dark such as nighttime. Hence, the solid-state imaging device 12 can obtain an image both in bright light and in the dark.

In other words, the 3D imaging apparatus according to the embodiment can obtain an image in the dark with poor lighting, as well as in bright light as automotive obstacle-detection systems and robotically assisted surgical systems can.

In addition, the arrangement of the color filters as described above makes it possible to obtain image signals generated of infrared light provided from all the pixels on a light-receiving element. This feature allows the second range image obtained by the TOF depth measurement and an image generated of infrared light to have higher resolution.

It is noted that the pixels of solid-state imaging device 22 included in the second imaging camera C2 according to the embodiment are arranged in a similar manner to those of the solid-state imaging device 12. The image signal extracting unit 23 included in the second imaging camera C2 is capable of performing an infrared differential operation similar to that performed by the image signal extracting unit 13 included in the first imaging camera C1.

In the case when no color image generated of visible light is required, each of the unit pixels 41 to 44 may be provided with a color filter sensitive to a specific wavelength range of visible light and a wavelength range of infrared light as shown in FIGS. 8A to 8D, respectively.

It is noted that in the case when a color image generated only of visible light is required, a color filter to be used may have a typical RGB Bayer arrangement.

Figure 9:
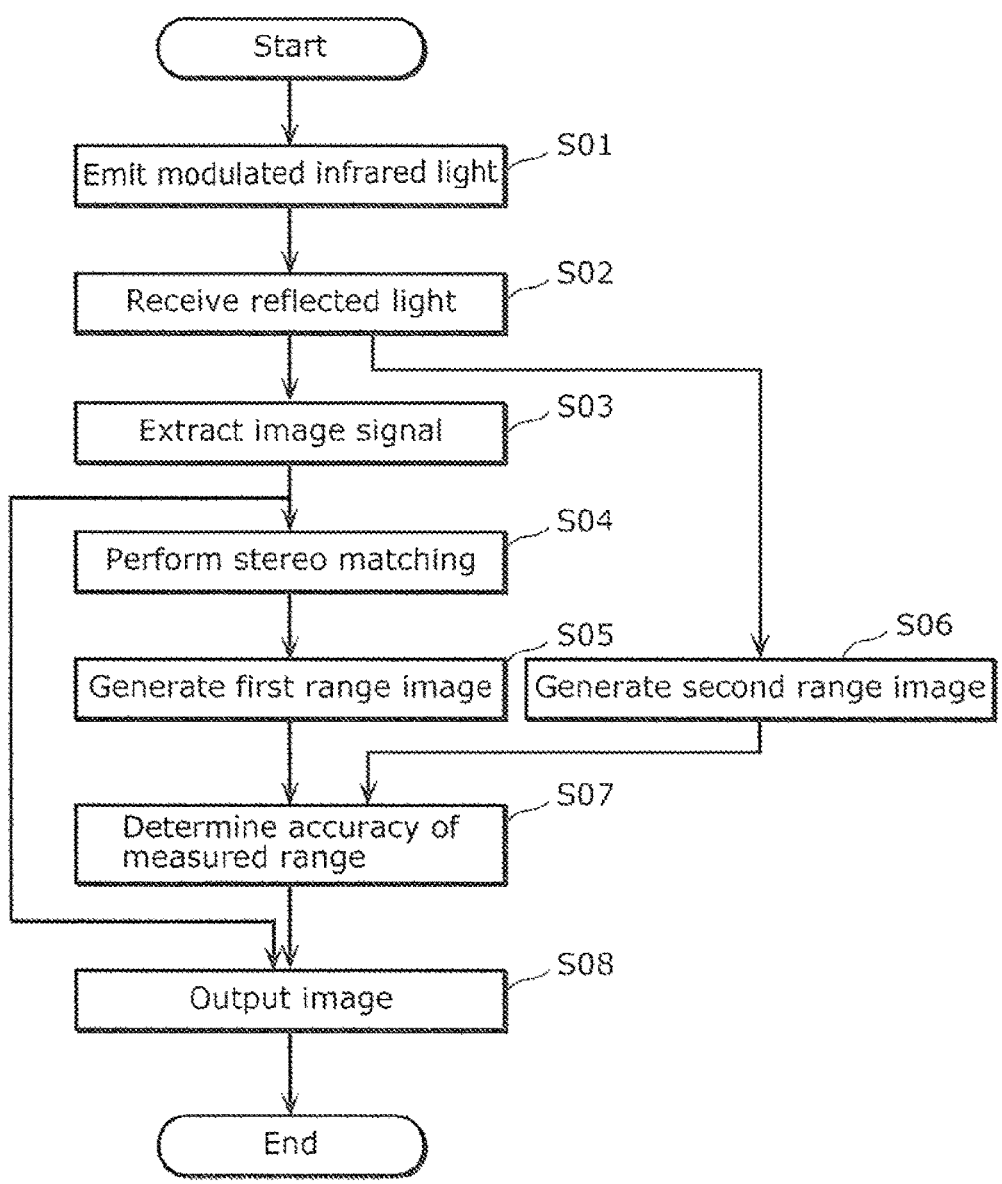
FIG. 9 depicts a flowchart showing processing performed by the 3D imaging apparatus according to the embodiment.

FIG. 9 depicts a flowchart showing processing performed by the 3D imaging apparatus 100 according to the embodiment.

The 3D imaging apparatus 100 first emits the infrared light L1 from the light source 1 to the object OBJ (S01). Here, the infrared light L1 has its light intensity modulated by the modulating signal Sg3.

The first imaging camera C1 and the second imaging camera C2 next respectively receive the reflected light R1 and the reflected light R2 from the object OBJ (S02).

The 3D imaging apparatus 100 then extracts the image signal G1 from the first imaging camera C1 as a base image and the image signal G2 from the second imaging camera C2 as a reference image (S03).

The stereo matching unit 3 then searches for corresponding pixels between the image signal G1 and the image signal G2 (S04).

The stereo matching unit 3 then measures by the principle of triangulation a difference of a part of an object image based on the searched corresponding pixels to generate the first range image signal D1 (S05).

Between Steps S03 and S05, the first imaging camera C1 also measures for each of pixels, a time of emitted light coming back from the object to generate the second range image signal D2 (S06).

Between the corresponding pixels, the range measurement accuracy determining unit 5 compares data of the first range image signal D1 with data of the second range image signal D2 to determine the accuracy of a measured depth (S07). Based on the determination result, the range measurement accuracy determining unit 5 generates a third range image signal D3 of which data is reconstructed as necessary out of the first range image signal D1 and the second range image signal D2. In the case where the corresponding pixels are not found by the stereo matching unit 3 when the stereo matching unit 3 is generating the first range image signal D1, it is beneficial for the range measurement accuracy determining unit 5 to be able to substitute appropriate pixel data for the pixel data of the second range image signal D2 to generate the third range image signal D3.

Finally, the image output switching control unit 6 performs switching control for selectively or simultaneously outputting the image signal G1, the image signal G2, and the third range image signal D3 on a display 7, and outputs these signals accordingly (S08).

The 3D imaging apparatus 100 and the image signal processing executed by the 3D imaging apparatus 100 according to the embodiment successfully achieve at once more accuracy and higher resolution in range image data, simplification of a set structure, and imaging in bright light as well as in the dark.

Describe next on the 3D imaging apparatus 100 according to the embodiment is a relationship between image information obtained by the first imaging camera C1 and image information obtained by the second imaging camera C2 and how to calculate a range between the image information and an object. The base principle here is a typical stereo matching.

Figure 10:
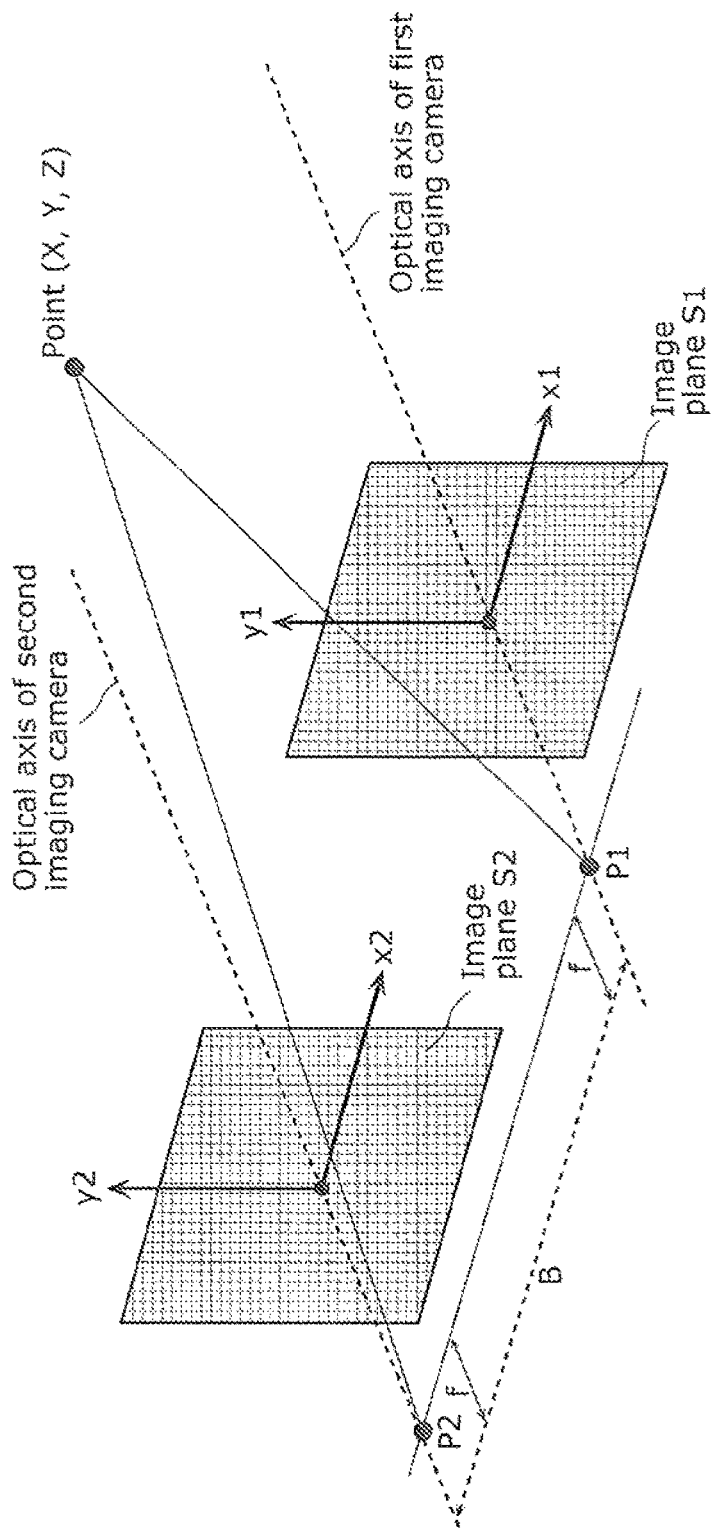
FIG. 10 shows a relationship between image information obtained by two imaging cameras according to the embodiment.

FIG. 10 shows a relationship between image information obtained by two imaging cameras according to the embodiment. The first imaging camera C1 and the second imaging camera C2 are placed with their optical axes aligned in parallel to each other, and the image planes of the first imaging camera C1 and the second imaging camera C2; namely an image plane S1 and an image plane S2, are horizontally set. Hence, the image planes S1 and S2 are on the same plane. Here, (x1, y1) is a coordinate system on the image plane S1 with its origin at the intersection between the image plane S1 and the optical axis of the first imaging camera C1, and (x2, y2) is a coordinate system on the image plane S2 with its origin at the intersection between the image plane S2 and the optical axis of the second imaging camera C2. When a focal point P1 for the first imaging camera C1 is the origin, spatial coordinates on the object are (X, Y, Z). Here, when all the coordinate X, the axis x1, and the axis x2 match one another in the direction from a focal point P2 for the second imaging camera C2 to the focal point P1 for the first imaging camera C1, the spatial coordinates (X, Y, Z) are represented as follows:

$Z = B \times f/(x2-x1)$  (Expression 1)

$X = (Z/f) \times x1$  (Expression 2)

$Y = (Z/f) \times y1$  (Expression 3)

Here, B is a range between the cameras and f is a focal length, and both B and f are constants. The constants are previously obtained as calibration parameters and stored in an internal memory. When the difference (x2−x1)—that is disparty—can be obtained with the expressions, the coordinate Z can be obtained with Expression 1. In addition, based on the position (x1, y1) of the first imaging camera C1 and the coordinate Z, the coordinates X and Y can be obtained with Expressions 2 and 3.

Figure 11:
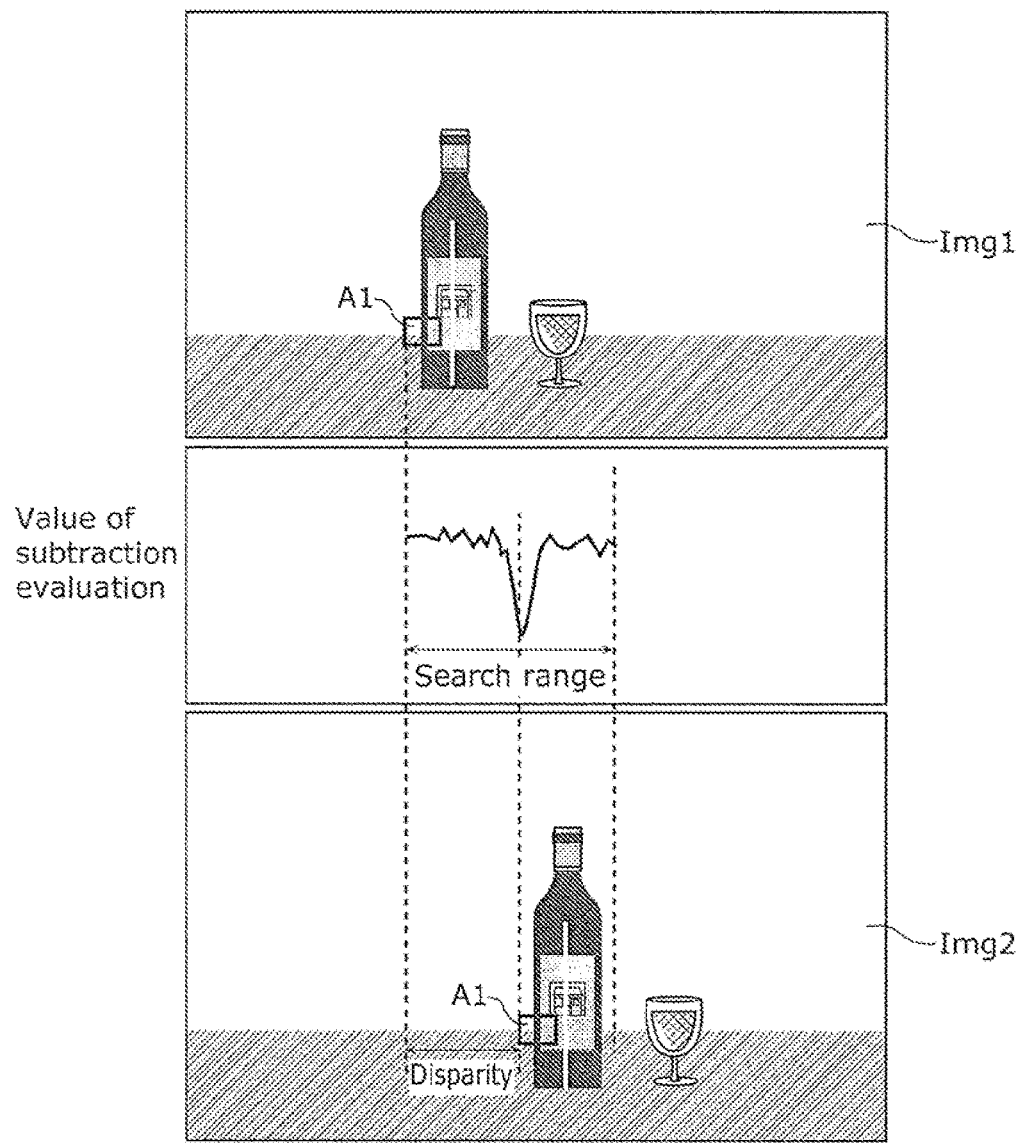
FIG. 11 shows how to calculate a disparity by stereo matching.

FIG. 11 shows how to calculate the disparity (x2−x1) by stereo matching. Suppose the two cameras obtain a first image Img1 and a second image Img2 as shown in FIG. 2. The stereo matching involves first selecting an object image part A1 from the first image Img1 used as a base image, and storing the pattern of the image. The stereo matching then involves shifting pixel by pixel the position of a segment A2 which is included in the second image Img2 used as a reference image and appears as large as the A1 in the first image Img1, evaluating a subtraction between the image pattern of the area A2 and the image pattern of the object image part A1 on the first image Img1, and searching for a point where the value of the subtraction evaluation is minimum. When the value of the subtraction evaluation is the minimum one, the area is found to be a corresponding segment, and the number of pixels for the difference to the corresponding area is obtained as the disparity. When the disparity is obtained as described above, the range (X, Y, Z) to the object is calculated with Expressions 1, 2, and 3 obtained based on the principle of triangulation.

Described hereinafter are comparative examples of the embodiment, with reference to the drawings.

Comparative Example 1

Figures 12, 13:
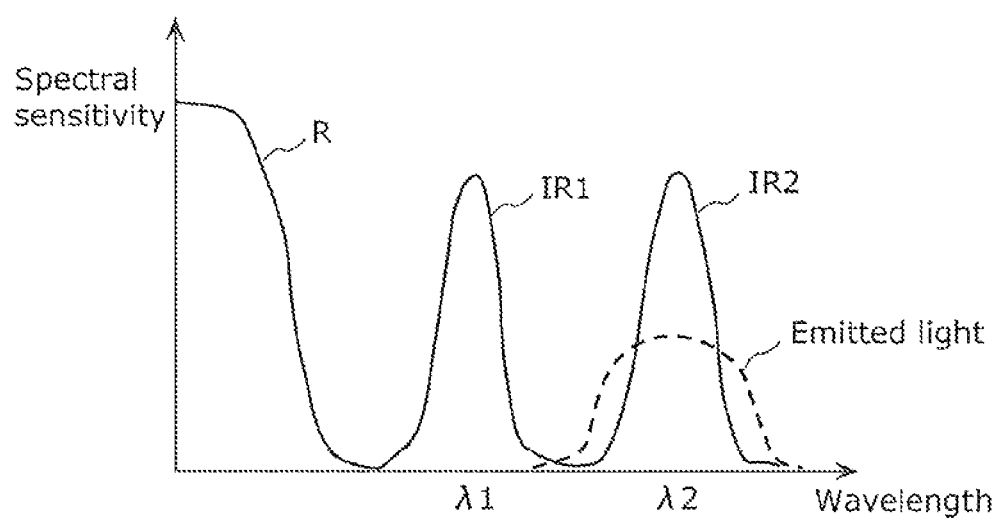
FIG. 12 shows an arrangement of the pixels included in a 3D imaging apparatus according to a comparative example of the embodiment.
FIG. 13 depicts a graph showing exemplary spectral characteristics of an IR1 filter and an IR2 filter.

FIG. 12 shows an arrangement of the pixels included in a 3D imaging apparatus according to a comparative example of the embodiment. The 3D imaging apparatus using the TOF depth measurement according to the comparative example includes a light-receiving element (a semiconductor device which receives light reflected off an object). Arranged on the light-receiving element for each pixel are filters for the three primary colors; namely an R filter, a G filter, and a B filter, as well as an IR1 filter which mainly passes infrared light of which wavelength is mostly $\lambda 1$, and an IR2 filter which passes infrared light of which (i) wavelength is mostly $\lambda 2$ that is greater than $\lambda 1$ and (ii) fight transmission area does not overlap with that of the IR1 filter. Moreover, four pixels provided with the R filter, the G filter, the B filter, and the IR1 filter are arranged in a square as one first unit array. In addition, four pixels provided with the R filter, the G filter, the B filter, and the IR2 filter are arranged in a square as one second unit array. The first unit array and the second unit array are alternately provided.

Due to the structure, the following technique could be implemented: (i) emitting to an object the infrared light whose wavelength is mostly $\lambda 2$ to obtain an image, and (ii) emitting to an object modulated light to measure the depth to the object using the amount of the modulated light bounced off the object. The technique, however, might not be able to accurately measure the range due to the effect of possible outside light. Hence, such effect has to be removed.

FIG. 13 depicts a graph showing exemplary spectral characteristics of an IR1 filter and an IR2 filter. The spectral characteristics in FIG. 13 show that the light-receiving element receives (i) only through the IR1 filter outer light and (ii) through the IR2 filter outer light and infrared light which is emitted to and reflected off the object. Hence, the component of the outer light can be removed when the intensity of the light passed the IR1 filter is subtracted from the intensity of the light passed the IR2 filter. Thus, even in the dark, the infrared light emitted to the object allows pixels provided with the IR1 filter and the IR2 filter to generate image signals and the 3D imaging apparatus to obtain an image of the object. The structure of the 3D imaging apparatus according to Comparative Example 1 shows, however, that the pixel having the IR1 filter sensitive to infrared light and the pixel having the IR2 filter are provided only on a part of the light-receiving element. Thus, obtaining an image with infrared light could inevitably decrease in the resolution of the image.

Comparative Example 2

Comparative Example 2 according to the embodiment shows stereo matching instead of the TOF depth measurement. The stereo matching involves obtaining a 3D image of an object without emitting light to the object. Specifically, the technique utilizes two cameras placed in parallel at a predetermined interval to obtain an object to search for corresponding pixels (stereo matching) between the obtained two images (a base image obtained by a base camera and a reference image obtained by a reference camera). Then, a difference of corresponding parts on the object images is measured by the principle of triangulation, and a range image of the object is obtained. This is how the stereo matching works.

Suppose two cameras obtain the first image Img1 and the second image Img2. The stereo matching involves first selecting an object image part A1 from the first image Img1 used as a base image, and storing the pattern of the image. The stereo matching then involves shifting pixel by pixel the position of a segment A2 which is included in the second image Img2 used as a reference image and appears as large as the A1 in the first image Img1, evaluating a difference between the image pattern of the area A2 and the image pattern of the object image part A1 on the first image Img1, and searching for a point where the value of the difference evaluation is minimum. When the value of the difference evaluation is the minimum one, the point is to be a corresponding segment, and the number of pixels for the difference to the corresponding area is obtained as the disparity.

When the disparity is obtained as described above, the range to the object is calculated based on the principle of triangulation.

In searching for the corresponding segment by the stereo matching, the entire segments of the two images do not have to be searched. The search is conducted only on a line—that is referred to as epipolar line—created when the line of sight for one camera is projected on the image plane of the other camera. Hence, with respect to a segment on one image, the corresponding segment on the other image is found when the search is conducted simply on the epipolar line. Such a feature contributes to reducing miscorrespondence which occurs by a search of an unnecessary area. Nevertheless, all the pixels on the epipolar line need to be searched for a corresponding segment, and the search could require substantial time.

Furthermore, another technique to be considered utilizes an additional camera separately located from the two cameras for the stereo matching. The technique involves detecting an object by obtaining an image using the additional camera and extracting a silhouette of the object from the image, and then searching for corresponding pixels only within the area of the object's silhouette by the stereo matching. Such a technique contributes to reducing a search time. In such a case, however, a disparity would not be clearly obtained very often from the two images. Unfortunately, it is impossible to obtain the disparity especially from relatively flat image planes with low contrast.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

It is noted that the embodiment introduced a 3D imaging apparatus including a CMOS solid-state imaging device as an example; however, the present disclosure shall not be defined as it is. A 3D imaging apparatus including a CCD solid-state imaging device can also obtain a similar effect.

INDUSTRIAL APPLICABILITY

Industrial applicability of a 3D imaging apparatus according to the present disclosure includes automotive obstacle-detection systems, robotically assisted surgical systems, and gesture recognition systems for arcade games.

The invention claimed is:

1. A 3D imaging apparatus comprising:
   a first imaging unit configured to capture an object to generate a base image to be used for obtaining a first range image which shows a three-dimensional character of the object in an image;
   a second imaging unit located separately from the first imaging unit and configured to capture the object to generate a reference image to be used for obtaining the first range image;
   a corresponding pixel searching unit configured to search for corresponding pixels between the base image and the reference image;
   a first range image generating unit configured to generate the first range image by calculating a disparity based on the corresponding pixels;
   a light source for emitting to the object infrared light whose intensity is modulated; and
   a synchronization signal supplying unit configured to supply the first imaging unit with a synchronization signal synchronized with the modulated intensity,
   wherein the first imaging unit is further configured to generate a second range image by receiving a reflected light based on the synchronization signal, the reflected light being the infrared light reflected off the object, and the second range image including range information on a range between a point of reflection off the object and the first imaging unit,
   each of the first range image and the second range image is an image which shows a distance between the first imaging unit and the object, and
   lines of sight are aligned on the same axis with each other between the first range image and the second range image.

2. The 3D imaging apparatus according to claim 1, further comprising
   a range measurement accuracy determining unit configured to determine accuracy of range information on the object and included in the first range image and the range information included in the second range image, by comparing data of the first range image with data of the second range image between the corresponding pixels,
   wherein, based on a result of the determination of the accuracy, the range measurement accuracy determining unit is configured to generate a third range image whose pixel data is reconstructed from the first range image and the second range image.

3. The 3D imaging apparatus according to claim 2,
   wherein, in the case where the corresponding pixels are not found by the corresponding pixel searching unit when the first range image are being generated, the distance measurement accuracy determining unit is configured to generate the third range image by substituting pixel data of the second range image for the corresponding pixels.

4. The 3D imaging apparatus according to claim 1,
   wherein each of the first imaging unit and the second imaging unit includes:
   a solid-state imaging device including an imaging area having unit arrays two-dimensionally arranged, each of the unit arrays including a first unit pixel provided with a filter which passes red visible light and infrared light, a second unit pixel provided with a filter which passes green visible light and infrared light, a third unit pixel provided with a filter which passes blue visible light and infrared light, and a fourth unit pixel provided with a filter which passes infrared light; and
   a signal extracting unit configured to extract from the solid-state imaging device a color image signal generated of visible light and an image signal generated of infrared light,
   the first imaging unit is configured to generate (i) the base image from the color image signal or the image signal generated of infrared light and (ii) the second range image from the image signal generated of infrared light, and
   the second imaging unit is configured to generate the reference image from the color image signal or the image signal generated of infrared light.

5. The 3D imaging apparatus according to claim 1,
   wherein each of the first imaging unit and the second imaging unit includes:
   a solid-state imaging device including an imaging area having unit arrays two-dimensionally arranged, each of the unit arrays including a first unit pixel provided with a filter which passes visible light having a specific wavelength range and infrared light, a second unit pixel provided with the filter, a third unit pixel provided with the filter, and a fourth unit pixel provided with a filter which passes infrared light; and a signal extracting unit configured to extract from the solid-state imaging device an image signal generated of visible light and an image signal generated of infrared light, the first imaging unit is configured to generate (i) the base image from the image signal generated of visible light or the image signal generated of infrared light and (ii) the second range image from the image signal generated of infrared light, and the second imaging unit is configured to generate the reference image from the image signal generated of visible light or the image signal generated of infrared light.

6. The 3D imaging apparatus according to claim 4, wherein the signal extracting unit includes an infrared subtracting unit configured to subtract a signal of the fourth unit pixel from each of a signal of the first unit pixel, a signal of the second unit pixel, and a signal of the third unit pixel, and the signal extracting unit is configured to extract one of the image signal generated of the visible light and the image signal generated of the infrared light from an image signal generated of visible light by the infrared subtraction unit and a luminance signal generated by one of the first unit pixel to fourth unit pixel.

7. The 3D imaging apparatus according to claim 5, wherein the signal extracting unit includes an infrared subtracting unit configured to subtract a signal of the fourth unit pixel from each of a signal of the first unit pixel, a signal of the second unit pixel, and a signal of the third unit pixel, and the signal extracting unit is configured to extract one of the image signal generated of the visible light and the image signal generated of the infrared light from an image signal generated of visible light by the infrared subtraction unit and a luminance signal generated by one of the first unit pixel to fourth unit pixel.

* * * * *